United States Patent
Lee et al.

(10) Patent No.: US 9,298,348 B2
(45) Date of Patent: Mar. 29, 2016

(54) MOBILE DEVICE AND METHOD FOR PROVIDING WIDGETS

(71) Applicant: PANTECH CO., LTD., Seoul (KR)

(72) Inventors: Seong Jun Lee, Seoul (KR); Seong Ho Lim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 198 days.

(21) Appl. No.: 14/182,928

(22) Filed: Feb. 18, 2014

(65) Prior Publication Data

US 2014/0245198 A1 Aug. 28, 2014

(30) Foreign Application Priority Data

Feb. 25, 2013 (KR) ........................ 10-2013-0019933

(51) Int. Cl.
| | |
|---|---|
| *G06F 3/00* | (2006.01) |
| *G06F 3/0481* | (2013.01) |
| *G06F 9/44* | (2006.01) |
| *G06F 3/0484* | (2013.01) |

(52) U.S. Cl.
CPC ........ *G06F 3/04817* (2013.01); *G06F 3/04845* (2013.01); *G06F 9/4443* (2013.01)

(58) Field of Classification Search
CPC .................................................. G06F 3/04817
USPC ......................................................... 715/762
See application file for complete search history.

(56) References Cited

U.S. PATENT DOCUMENTS

| | | | | |
|---|---|---|---|---|
| 7,764,956 | B2 * | 7/2010 | Herberger ................. | G06F 8/34 455/414.1 |
| 8,793,607 | B2 * | 7/2014 | Jeong .................. | G06F 3/04817 715/762 |
| 8,874,665 | B2 * | 10/2014 | Peterson ............. | G06F 3/04817 709/203 |
| 8,972,873 | B2 * | 3/2015 | Gerken, III ............... | G06F 8/38 715/747 |
| 2003/0193521 | A1* | 10/2003 | Chen ...................... | G06F 9/4443 715/762 |
| 2006/0033884 | A1* | 2/2006 | Sato ....................... | G06F 3/0386 353/30 |
| 2007/0118813 | A1* | 5/2007 | Forstall ................. | G06F 3/0486 715/805 |
| 2007/0297004 | A1* | 12/2007 | Honda .................. | G06F 17/248 358/1.15 |
| 2008/0117448 | A1* | 5/2008 | Ijams ...................... | G06T 11/60 358/1.15 |

(Continued)

FOREIGN PATENT DOCUMENTS

| | | |
|---|---|---|
| KR | 10-2008-0037089 | 4/2008 |
| KR | 10-0877059 | 12/2008 |
| WO | 2012/128457 | 9/2012 |

*Primary Examiner* — William Titcomb
(74) *Attorney, Agent, or Firm* — H.C. Park & Associates, PLC

(57) ABSTRACT

A mobile device and method for providing a widget on a home screen is disclosed herein. The mobile device including: a storage unit to store a plurality of widgets and predetermined templates, a determiner to determine a template with one or more cells having one or more attributes, an applier to apply the determined template to the widget selected by adjusting the widget or the template, an editor to edit the template, and a display unit to display the widget corresponding to the determined template.

18 Claims, 13 Drawing Sheets

(56) References Cited

U.S. PATENT DOCUMENTS

| | | | |
|---|---|---|---|
| 2008/0189638 A1* | 8/2008 | Mody | G05B 19/0426 715/771 |
| 2008/0195997 A1* | 8/2008 | Herberger | G06F 8/34 717/100 |
| 2009/0228838 A1* | 9/2009 | Ryan | G09G 5/14 715/853 |
| 2009/0327321 A1* | 12/2009 | McCormack | G06F 17/30569 |
| 2010/0005421 A1* | 1/2010 | Yoshioka | G06F 3/04817 715/835 |
| 2011/0060994 A1* | 3/2011 | Maxwell | G06F 3/147 715/730 |
| 2011/0066477 A1* | 3/2011 | Fujioka | G06F 8/36 705/14.4 |
| 2012/0102390 A1* | 4/2012 | Zhang | G06F 17/30905 715/234 |
| 2012/0290955 A1* | 11/2012 | Quine | G06F 8/34 715/763 |
| 2013/0067361 A1* | 3/2013 | Gehani | G06F 3/00 715/762 |
| 2013/0159406 A1* | 6/2013 | Chand | G06Q 10/10 709/204 |
| 2013/0191723 A1* | 7/2013 | Pappas | G06F 17/30917 715/234 |
| 2013/0191726 A1* | 7/2013 | Park | G06F 8/38 715/235 |
| 2013/0311875 A1* | 11/2013 | Pappas | G06F 17/2247 715/234 |
| 2014/0189549 A1* | 7/2014 | Shuttleworth | G06F 3/0484 715/762 |
| 2015/0058744 A1* | 2/2015 | Dhingra | G06F 3/04842 715/747 |
| 2015/0169211 A1* | 6/2015 | Shin | G06F 1/1626 715/762 |

* cited by examiner

DETERMINE TEMPLATE 410

APPLY TEMPLATE 420

ADJUST SIZE AND
POSITION OF WIDGET 430

PROCESS AREA OF WIDGET 440

MOBILE DEVICE AND METHOD FOR PROVIDING WIDGETS

CROSS-REFERENCE TO RELATED APPLICATION

This application claims priority from and the benefit under 35 U.S.C. §119(a) of Korean Patent Application No. 10-2013-0019933, filed on Feb. 25, 2013, in the Korean Intellectual Property Office, which is hereby incorporated by reference for all purposes as if fully set forth herein.

BACKGROUND

1. Field

The following description relates to an apparatus and method for providing a widget on a home screen of a mobile device.

2. Discussion of the Background

Widget generally refers to a graphical user interface (GUIs) which is a mini application supporting smoother interaction between a user, an application program, and an operating system. Technology for providing a widget on a home screen of a mobile device may include providing a widget having a grid structure in a two-dimensional (2D) array. An area corresponding to a grid structure of a widget may be provided in a rectangular shape.

Current technology providing widgets with a rectangular grid structure require the entire rectangular space on a home screen of a mobile device to be displayed. In this case, a user cannot display other objects such as widgets or icons distinct from the widget displayed in an overlapping fashion in the grid area of the widget displayed. Further, it is not possible for a user to select portions of the grid area of the widget to display or to not display. Thus, grid areas not displaying any widget information are wasted areas.

SUMMARY

Exemplary embodiments of the present invention provide a mobile device and a method for providing widgets.

Exemplary embodiments of the present invention provide a mobile device and a method for providing widgets having various shapes by processing a widget using a template including a first area and a second area having different attributes.

Additional features of the invention will be set forth in the description which follows, and in part will be apparent from the description, or may be learned by practice of the invention.

An exemplary embodiment of the present invention provides a mobile device including a storage unit to store widgets; a determiner to determine a template including at least once cell with an attribute; an applier to apply the template to a widget (by adjusting the widget); and a display unit to display the widget corresponding to the attribute of the template determined.

An exemplary embodiment of the present invention provides a method for providing widgets, including storing widgets; determining a template with a cell having attributes; applying the template to a widget (by adjusting the widget); and displaying the widget corresponding to the attribute of the template determined.

It is to be understood that both the foregoing general description and the following detailed description are exemplary and explanatory and are intended to provide further explanation of the invention as claimed. Other features and aspects will be apparent from the following detailed description, the drawings and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1A:
FIG. 1A and FIG. 1B are diagrams illustrating a weather widget provided according to a related art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, XZZ, YZ, X).

Figure 1B:
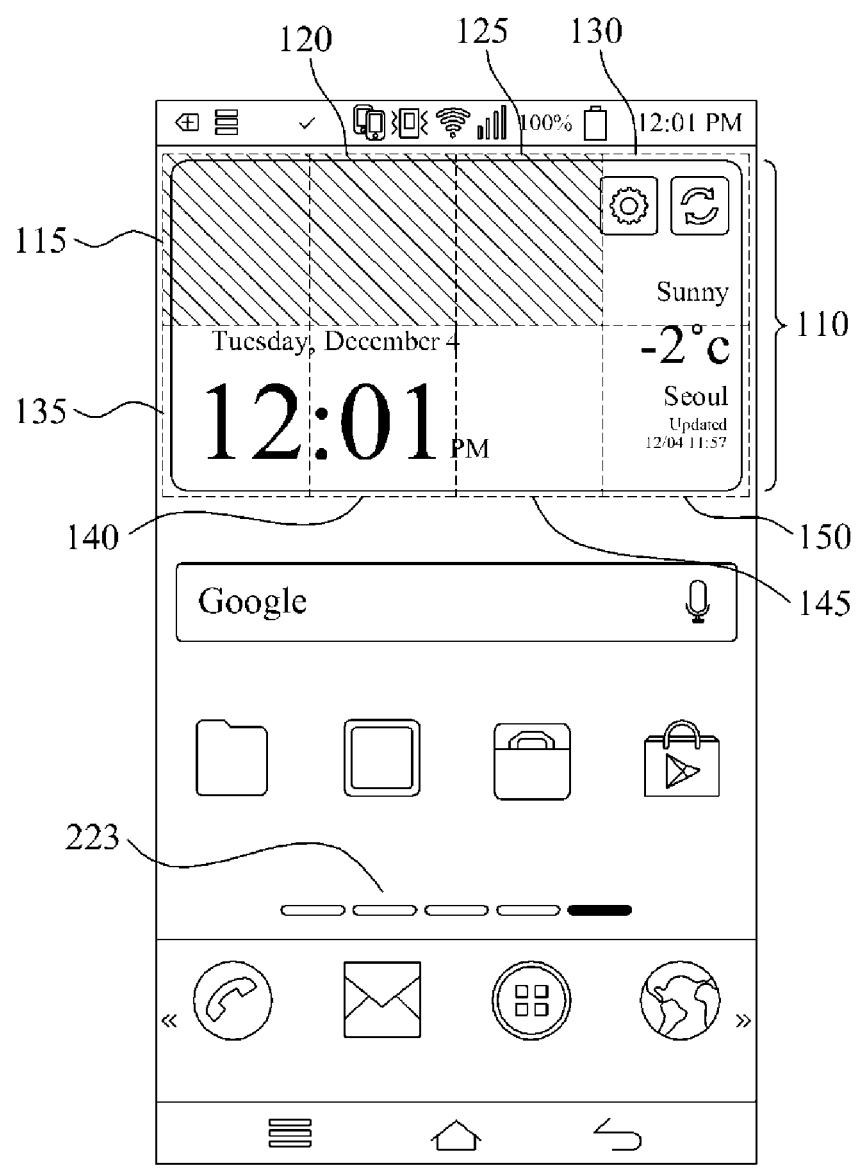

FIG. 1A and FIG. 1B are diagrams illustrating a weather widget 105 provided according to a related art.

A widget may refer to a mini application which is one of graphical user interfaces (GUIs) supporting smoother interaction between a user, an application program, and an operating system.

Referring to FIG. 1A and FIG. 1B, the weather widget 105 may have a grid structure 110 including a plurality of cells 115, 120, 125, 130, 135, 140, 145, and 150. The grid structure 110 corresponds to a display area of the weather widget 105 on a home screen of a mobile device. The grid structure 110 may be an area of the weather widget 105 that corresponds to at least one or more of the plurality of cells of the home screen.

As shown in FIG. 1B, cell 115 refers to portion of an area of the weather widget 105. The weather widget 105 may be displayed on the home screen of a mobile device within the grid structure 110 area constituting the home screen of the mobile device. In this example, a widget refers to a mini application which is one of the graphical user interfaces (GUIs) in a mobile device supporting smoother interaction between a user, an application program, and an operating system.

The weather widget 105 may be provided in a grid structure 110 having form of a two-dimensional (2D) array including the plurality of cells 115, 120, 125, 130, 135, 140, 145, and 150. The grid structure 110 of the weather widget 105 has a rectangular shape and the width and the length may be fixed.

As shown in FIG. 1B, certain cells of the weather widget 105 may not display any weather information.

For example, the weather widget 105 may have a grid structure 110 in a 2D array including the 4×2 cells 115, 120, 125, 130, 135, 140, 145, and 150. Accordingly, weather information may not be displayed in areas of a portion of the cells, for example, cells 115, 120, and 125. Further, another widget, icon, and object, distinct from the weather widget may not be disposed in such cells, and thus, cells 115, 120, and 125 may be wasted areas.

In addition, when a widget provided in a circular shape is displayed, another widget, icon, and object distinct from a selected widget may not be disposed in a cell corresponding to the boundary portion. A further description will be provided below.

Figure 2A:
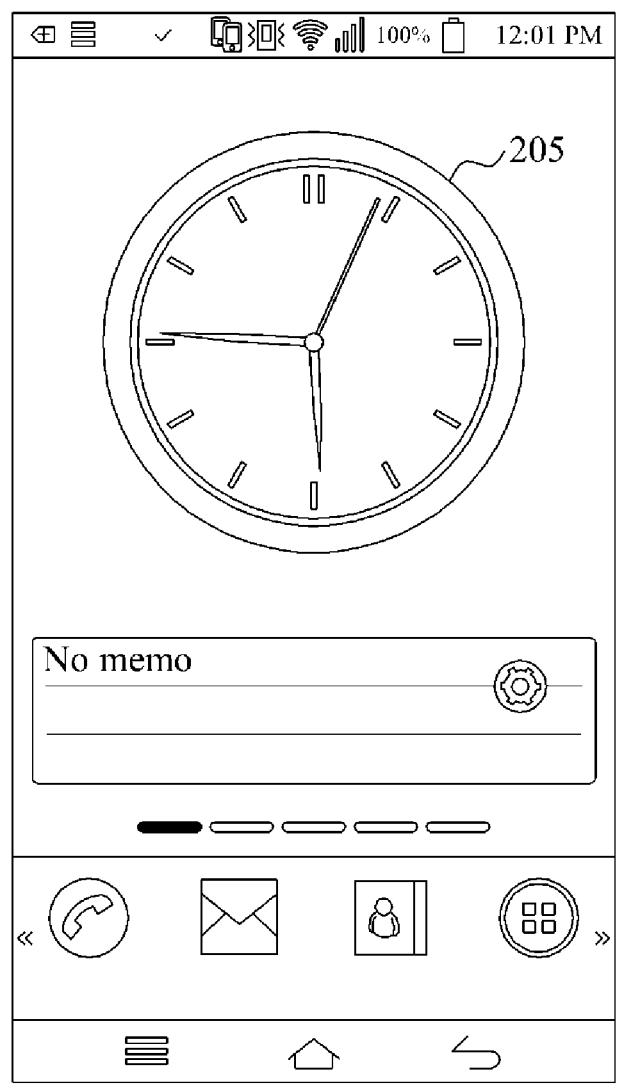
FIG. 2A and FIG. 2B are diagrams illustrating a clock widget provided according to a related art.
Figure 2B:
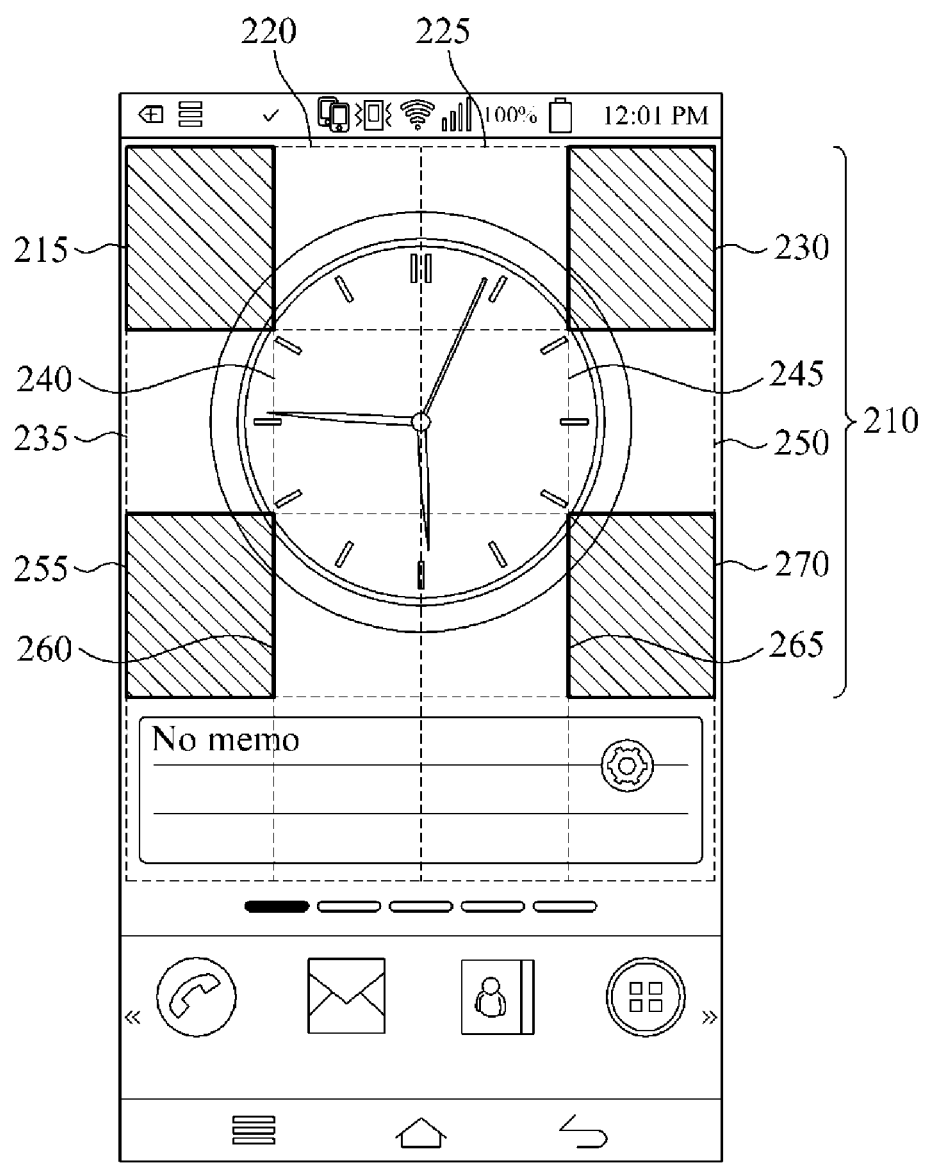

FIG. 2A and FIG. 2B are diagrams illustrating a clock widget 205 provided according to a related art.

FIG. 2A illustrates a clock widget 205 in a circular shape displayed on a home screen of a mobile device. FIG. 2B illustrates the clock widget 205 may have a 4×3 grid structure 210 including cells 215, 220, 225, 230, 235, 240, 245, 250, 255, 260, 265, and 270. The clock widget 205 having a grid structure 210 may be displayed in 2D on a 4×3 cell area of a home screen of a mobile device.

The clock widget 205 may be provided to have a grid structure 210 in a 2D array including the plurality of cells 215, 220, 225, 230, 235, 240, 245, 250, 255, 260, 265, and 270. Since the grid structure 210 of the clock widget 205 has a rectangular shape, with the width and the length fixed, specific cells of the grid structure 210 of the clock widget 205 may not display clock information.

For example, cells 215, 230, 255, and 270 corresponding to the boundary portion of the clock widget may not display clock information. The circular clock widget 205 may be displayed on the grid structure 210 provided in a 2D array including the 4×3 cells 215, 220, 225, 230, 235, 240, 245, 250, 255, 260, 265, and 270. Further, another widget, icon, and object, distinct from the clock widget 205, may not be disposed in these cells, and thus, cells 215, 230, 255, and 270 may be wasted areas.

Figure 3:
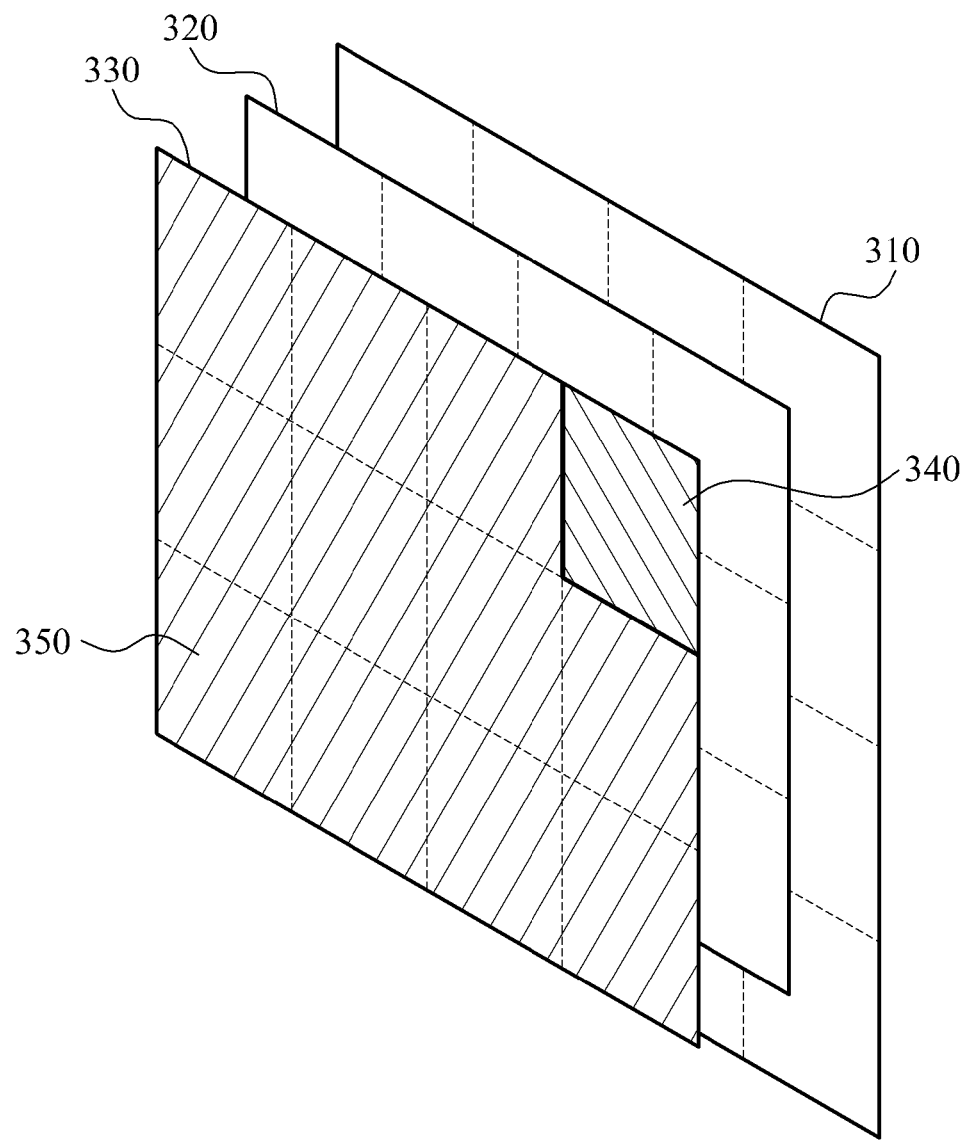
FIG. 3 is a diagram illustrating a home screen, a widget, and a template according to an exemplary embodiment of the present invention.

FIG. 3 is a diagram illustrating a home screen 310, a widget 320, and a template according to an exemplary embodiment of the present invention.

As illustrated in FIG. 3, the home screen 310 of a mobile device, the widget 320, and the template 330 may have a grid structure comprising a plurality of cells. The template 330 may be a virtual mask to assign a display attribute to an object, for example, a widget or an icon, disposed on the home screen 310. The template may be a virtual mask to assign an overlapping disposition attribute to dispose other objects, for example, a widget or an icon, on the home screen 310. A single template may be configured to assign both the display attribute and the overlapping disposition attribute or be configured to assign either the display attribute or the overlapping disposition attribute. The term mask may be interchangeable with various terms, including, window, frame, etc. In addition, a size of a grid structure constituting the widget 320 may be identical to or different from a size of a grid structure constituting the template. In particular, different areas of the grid structure constituting the template may have different display attributes and/or overlapping disposition attributes, respectively. For example, the widget 320 may be displayed through an area of the template, and disposition of objects other than the widget 320, may be prohibited in that area. Conversely, the home screen 310, rather than a widget 320, may be displayed through the remaining area of the template, and disposition of objects other than the widget 320 may be allowed in the remaining area.

The template 330 may be assigned with display attributes to allow display or attributes to prohibit display, among display attributes.

The template 330 may be assigned with disposition attributes to allow overlapping disposition or attributes to prohibit overlapping disposition, among overlapping disposition attributes.

For example, the template 330 may be applied to the widget 320 in order to display the widget 320 in a shape and/or size desired by a user on the home screen 310 of the mobile device. As shown in FIG. 3, the template 330 may include a first area 350 and a second area 340 having different attributes.

The first area 350 and the second area 340 of the template may be provided in various shapes. The first area 350 may include cells set by a first attribute to allow disposition of another widget, icon, and/or object other than the selected widget. The second area 340 may include cells set by a second attribute to prohibit disposition of another widget, icon, and/or object distinct from a selected widget.

A method of providing a widget according to an exemplary embodiment of the present invention may include applying the template 330 comprising the first area and second area with different display attributes to the widget 320. As a result of applying the template 330, an area of the widget 320 corresponding to the second area 340, rather than an area of the widget 320 corresponding to the first area 350 of the template can be displayed on the home screen 310. Thereby providing a widget having a shape and size desired by the user on the home screen 310 of the mobile device. The method may include determining the template including the first area 350 and the second area 340, and adjusting at least one of the position, size, and shape of the widget 320 to fit within the determined template.

Accordingly, the method may include receiving determination on the first area 350 and the second area 340 of the template from the user, and applying the determined template to the widget 320, thereby achieving an effect of adjusting at least one of the position, the size, and the shape of the widget 320.

Further, in this example, an area of the widget 320 corresponding to the first area 350, and an area of the widget 320 corresponding to the second area 340 may be displayed using different visual representations, which will be described in detail hereinafter.

Hereinafter, a method for providing a widget according to an exemplary embodiment of the present invention will be described in detail with reference to FIG. 4A through FIG. 4D.

Figure 4A:
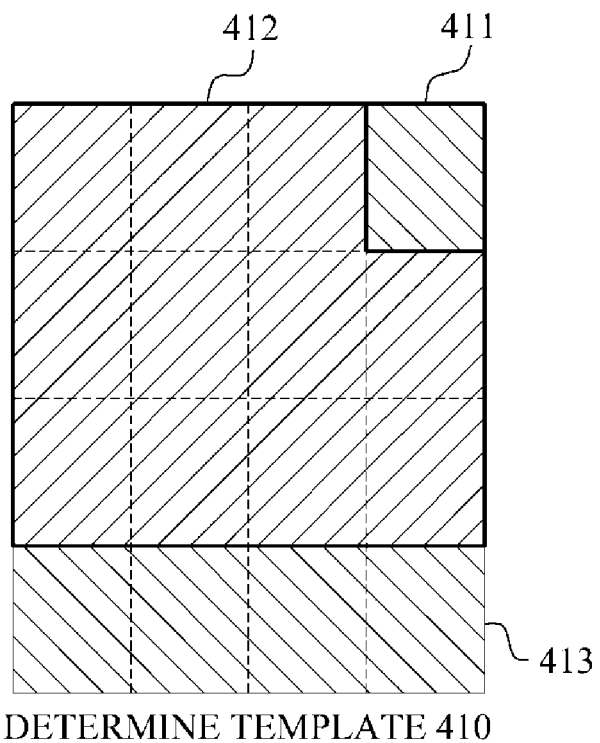
FIG. 4A, FIG. 4B, FIG. 4C, and FIG. 4D are diagrams illustrating a method of providing a widget according to an exemplary embodiment of the present invention.
Figure 4B:
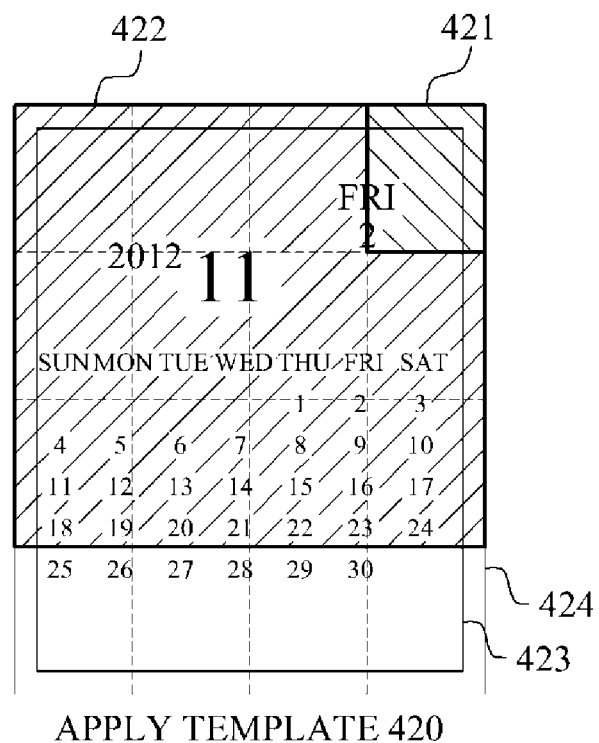
Figure 4C:
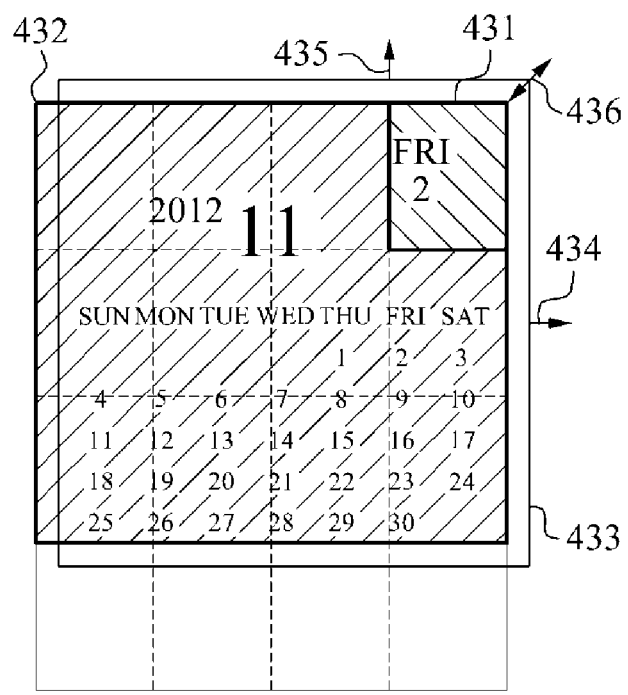
Figure 4D:
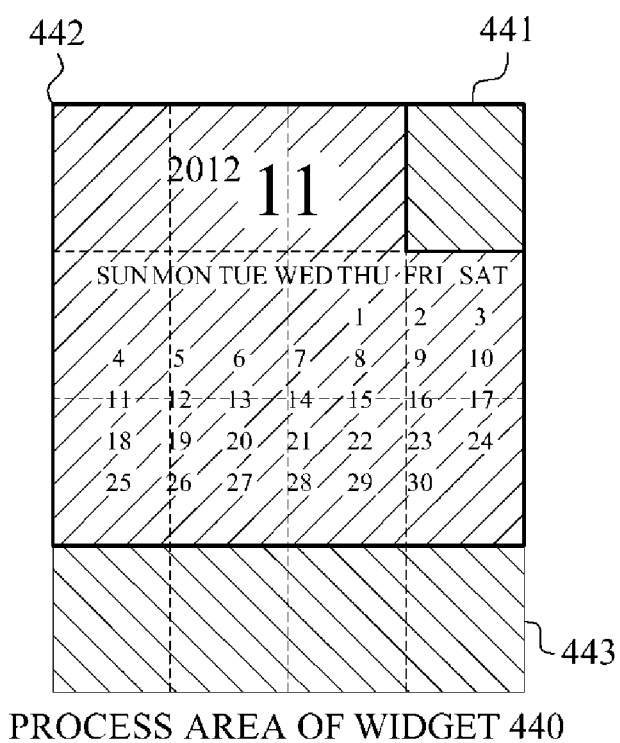

FIG. 4A illustrates a process 410 of determining a template; FIG. 4B illustrates a process 420 of applying the determined template to the widget 423; FIG. 4C illustrates a process 430 of adjusting a position and a size of a widget; and FIG. 4D illustrates, and a process 440 of processing an area of the widget.

As shown in FIG. 4A, areas and attributes of the areas in a template may be determined. For example, the template may include a first area 411 and a second area 412 having different attributes.

The first area 411 and/or the second area 412 may be provided in various predetermined shapes, and may also be provided in shapes set by a user directly. The first area 411 may include cells set by a first attribute to allow disposition of another widget, icon, and/or object distinct from a selected widget. The second area 412 may include cells set by a second attribute to prohibit disposition of another widget, icon, and/or object distinct from a selected widget. For example, disposition of another widget, icon, and/or object distinct from a selected widget may be allowed in the first area 411 in addition to the selected widget. Such disposition is similar to disposing a widget, icon, and/or object in an area 413 outside of the template area on a home screen of a mobile device.

As shown in FIG. 4B, the determined template 410 may be applied to a widget 423 selected by the user from a plurality of widgets. For example, the size of the selected widget 423 may be large enough to be displayed in entire area 424 of the home screen of the mobile device.

As shown in FIG. 4C, applying a determined template to a selected widget 433 may be performed by adjusting the size and/or position of the selected widget 433 to be included within first area 431 or second area 432 of the determined template. If the selected widget 433 is larger than the first area 431 and the second area 432 of the determined template, and is partly positioned in the remaining area outside of the template on the home screen of the mobile device, the size and position of the selected widget 433 may be adjusted to be included in the first area 431 or the second area 432 of the template. For example, the size of the selected widget 433 may be reduced and the position may be adjusted in directions 434 and 435, to be included in the second area 432 of the template. In addition, the position of the template may be adjusted to include the selected widget 433, by moving the template while the selected widget 433 is fixed.

As shown in FIG. 4D, if the template is applied to the selected widget 433, an area of the selected widget corresponding to a first area 441 and area of the selected widget corresponding to a second area 442 may be processed, in response to the result of the application. Accordingly, the first area 441 and/or the second area 442 of the template may be determined by a user, and applied to the widget, thereby achieving an effect of adjusting at least one of a position, a size, and a shape of the widget.

The area of the selected widget corresponding to the first area 441 and the second area 442 of the template may be processed such that the first area 441 and the second area 442 are displayed using different visual representations. For example, the selected widget may be displayed in the second area 442, and a home screen may be displayed directly in the first area 441 rather than the information of the selected widget corresponding to the first area 441. For example, when a predetermined image is set as wallpaper and displayed on the home screen, the wallpaper may be displayed in the first area 441 rather than the information of the widget corresponding to the first area 441.

In addition, the areas of the selected widget may be processed such that disposition of another widget, icon, and object distinct from the selected widget is allowed in the area of the selected widget corresponding to the first area 441, and prohibited in the areas of the selected widget corresponding to the second area 442. If a calendar widget is selected by a user, a determined template is applied and areas of a selected widget are processed, another widget, icon, and object distinct from the calendar widget may be disposed in the first area 441. For example, a user may dispose a clock widget or a temperature widget in the first area 441, similar to disposing a widget on a remaining region 443 outside of the template area.

Figure 5:
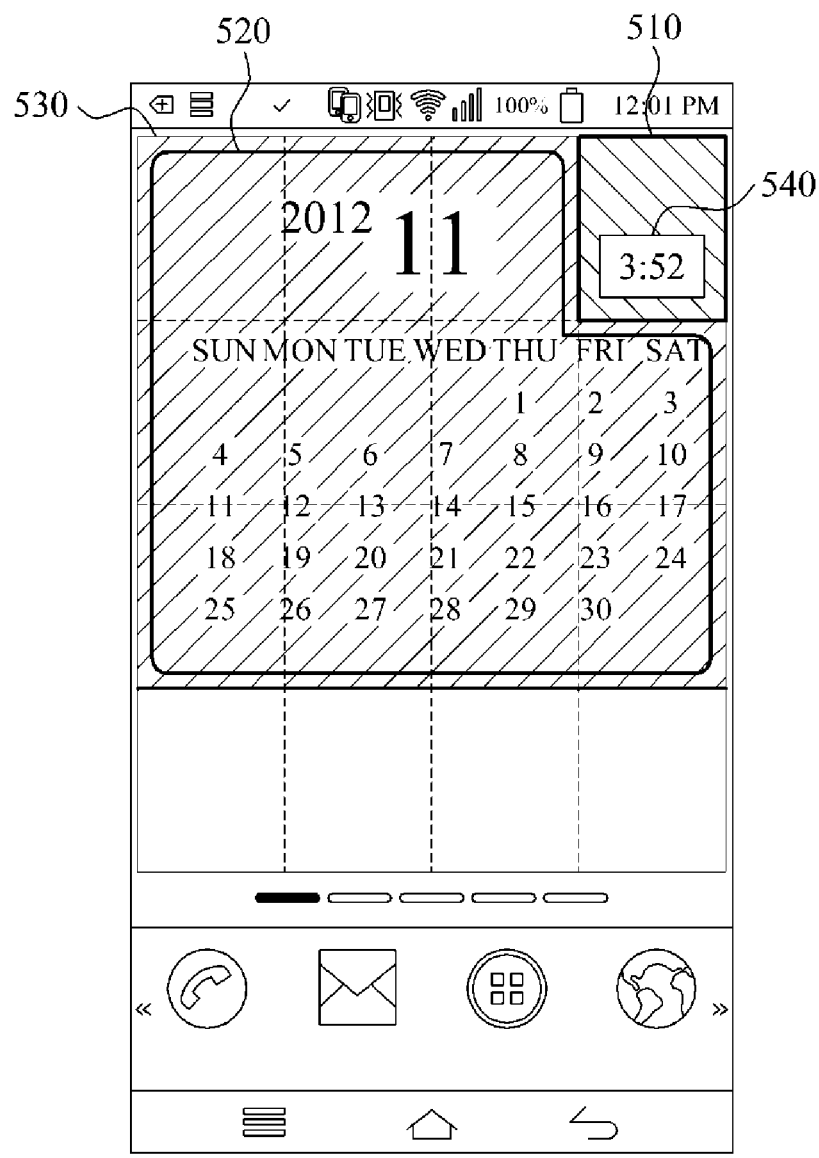
FIG. 5 is a diagram illustrating widgets provided according to an exemplary embodiment of the present invention.

FIG. 5 is a diagram illustrating widgets 520 and 540 displayed on a home screen of a mobile device according to an exemplary embodiment of the present invention.

As shown in FIG. 5, the display of the widgets 520 and 540 may overlap.

For example, the first widget 520 may be a calendar widget provided using a first template. The first template may include a first area 510 and a second area 530 having different display attributes and overlapping disposition attributes. Display of the first widget may be allowed in the second area 530 of the first template but prohibited in the first area 510 of the first template. In addition, disposition of another widget, icon, and/or object distinct from the first widget 520 may be allowed in the first area 510 of the first template, but prohibited in the second area 530 of the first template.

Accordingly, the first widget 520 provided using the first template may be displayed in an area corresponding to the second area 530 of the first template but not in an area corresponding to the first area 510 of the first template.

In addition, if the first template includes only the second area 530, the disposition of the other widget, icon, and object may be prohibited in an area of the first widget 520 corresponding to the second area 530, and allowed in an area of the first widget 520 not corresponding to the second area 530. In addition, the area of the first widget 520 corresponding to the second area 530 may be displayed, and the area of the first widget 520 not corresponding to the second area 530 may not be displayed.

The second widget 540 in FIG. 5 may be a clock widget provided using a second template. The second template may include a first area 530 and a second area 510 having different display attributes and overlapping disposition attributes. Display of the second widget may be allowed in the second area 510 of the second template but prohibited in the first area 530 of the second template. In addition, disposition of another widget, icon, and object distinct from the second widget 540 may be allowed in the first area 530 of the second template, but prohibited in the second area 510 of the second template.

Accordingly, the second widget 540 provided using the second template may be displayed in an area corresponding to the second area 510 of the second template but not in an area corresponding to the first area 530 of the second template.

In addition, if the second template includes only the second area 510, the disposition of the other widget, icon, and object may be prohibited in an area of the second widget 540 corresponding to the second area 510, and allowed in an area of the second widget 540 not corresponding to the second area 510. In addition, the area of the second widget 540 corresponding to the second area 510 may be displayed, and the area of the second widget 540 not corresponding to the second area 510 may not be displayed.

Figure 6:
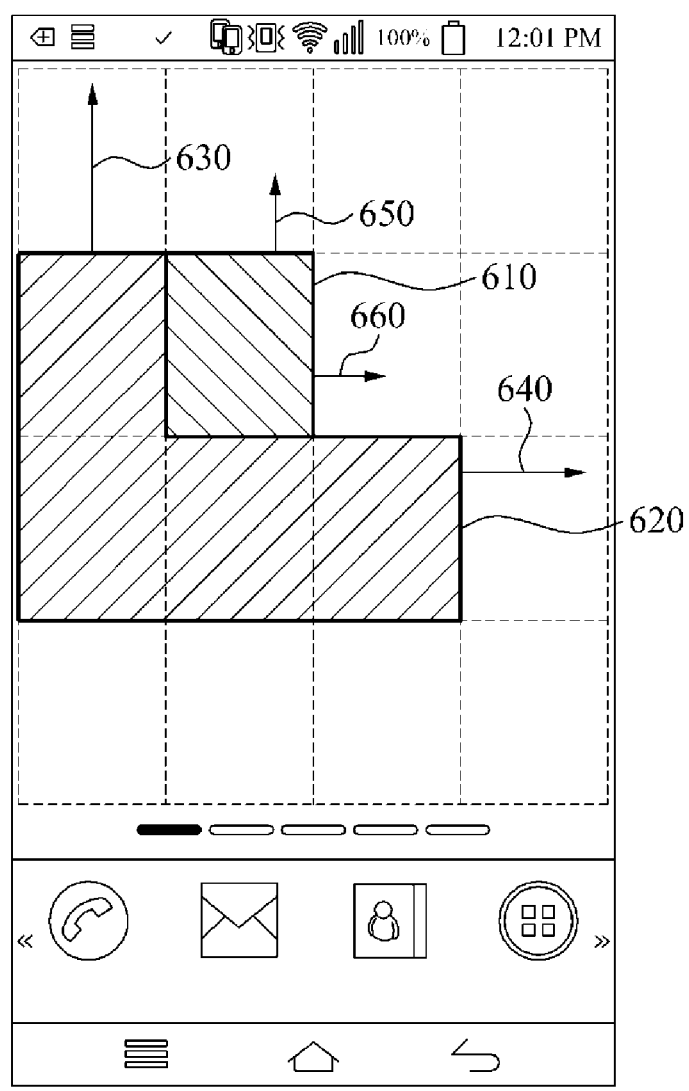
FIG. 6 is a diagram illustrating a function to edit a template according to an exemplary embodiment of the present invention.

FIG. 6 is a diagram illustrating a function to edit a template according to an exemplary embodiment of the present invention.

As shown in FIG. 6, a method for providing a widget according to an exemplary embodiment of the present invention may provide a function to edit a template. A template may be edited by adjusting a first area 610 and/or a second area 620 included in the template in directions 630, 640, 650, and 660, depending on attributes of the first area 610 and second area 620 of the template For example, a first area 610 of the template may have a first disposition attribute to allow disposition of another widget, icon, and object distinct from a selected widget, and a second area 620 of the template may have a second disposition attribute to prohibit disposition of another widget, icon, and object distinct from a selected widget. If the first area 610 is edited in the directions 650 and 660 by a user to include a greater number of cells, the plurality of cells included in the edited first area 610 may have a first disposition attribute to allow disposition of another widget, icon, and object distinct from a selected widget. In addition, if the second area 620 is edited in the directions 630 and 640 by the user to include a greater number of cells, the plurality of cells included in the edited second area 620 may have a second disposition attribute to prohibit disposition of another widget, icon, and object distinct from a selected widget.

In addition, the method may include receiving a user input to edit a template, and also providing a plurality of predetermined templates to the user and receive a user selection. Thereby, a template edited by a user or a predetermined template selected by a user may be applied to the widget.

Figure 7:
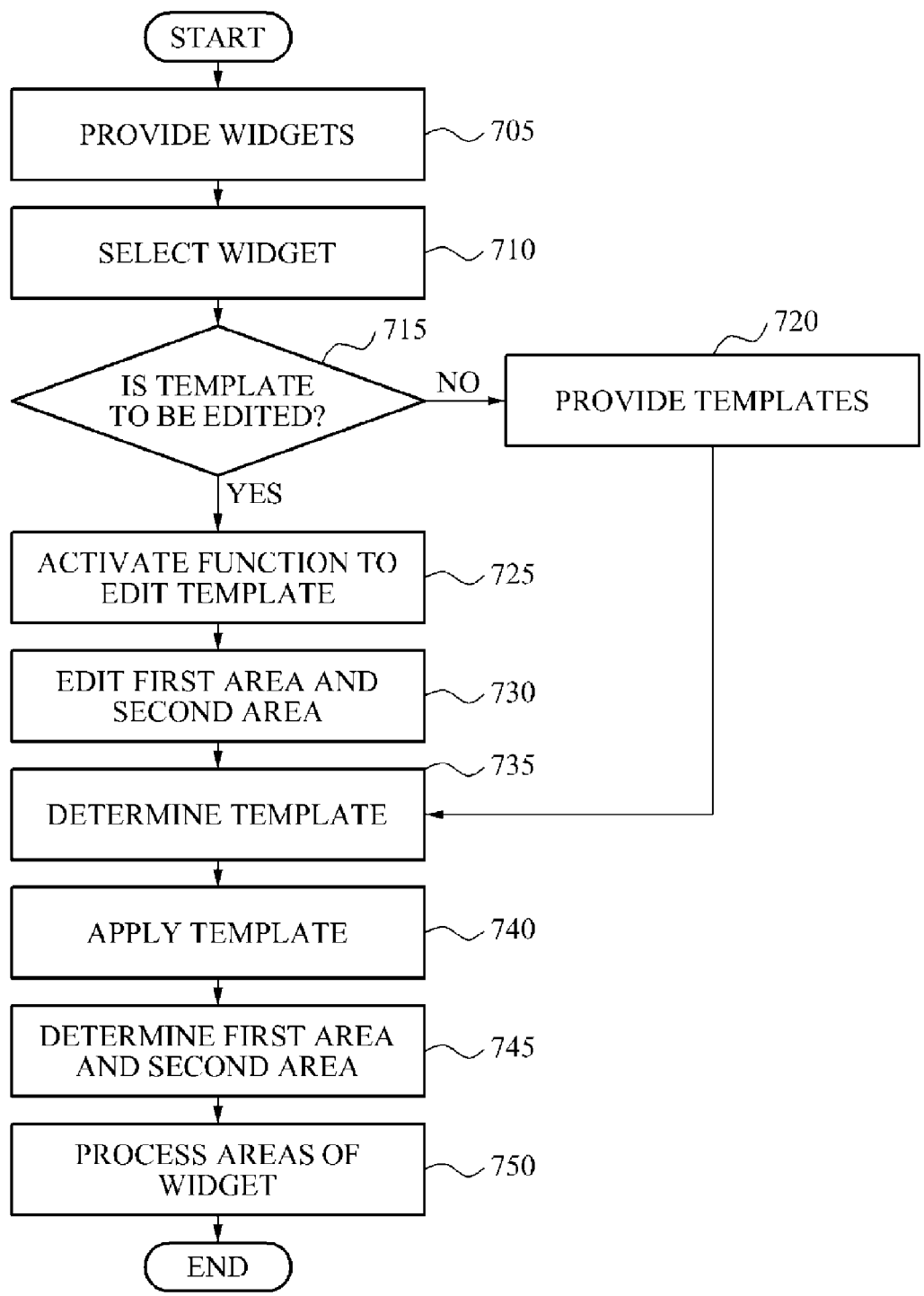
FIG. 7 is a flowchart illustrating a method of providing a widget according to an exemplary embodiment of the present invention.

FIG. 7 is a flowchart illustrating a method for providing a widget according to an exemplary embodiment of the present invention.

As shown in FIG. 7, in operation 705, a plurality of widgets may be provided to a user.

In operation 710, a specific widget may be selected based on a user's selection.

In operation 715, whether a template is to be edited may be determined by a user.

If the user decides to edit a template in operation 715, a function to edit the template may be activated in operation 725.

In operation 730, a first area and a second area included in the template may be edited, based on attributes set for cells included in a grid of the template.

In operation 735, a template including the first area and the second area having different attributes may be determined.

When it is determined that the template is not to be edited, a plurality of predetermined templates may be provided to the user in operation 720. In operation 735, a template may be determined in response to selection of one of the plurality of templates from the user.

When the template is determined, the determined template may be applied to a selected widget, in operation 740. In this instance, a process of applying the determined template to the selected widget may include a process of adjusting at least the size and/or position of the selected widget to be included within the determined template.

In operation 745, cells set by a first attribute in a grid structure of the template may be determined to be the first area, and cells set by a second attribute in the grid structure of the template may be determined to be the second area.

In operation 750, an area of the selected widget corresponding to the first area and area of the selected widget corresponding to the second area may be processed, in response to the result of the template being applied to the widget. In this instance, a processing the areas of the selected widget may include a process of displaying the area of the selected widget corresponding to the first area the second area, using different visual representations, and a process of processing the areas of the selected widget such that disposition of other icons distinct from the selected widget is allowed in the area of the selected widget corresponding to the first area, and prohibited in the areas of the selected widget corresponding to the second area.

Figure 8:
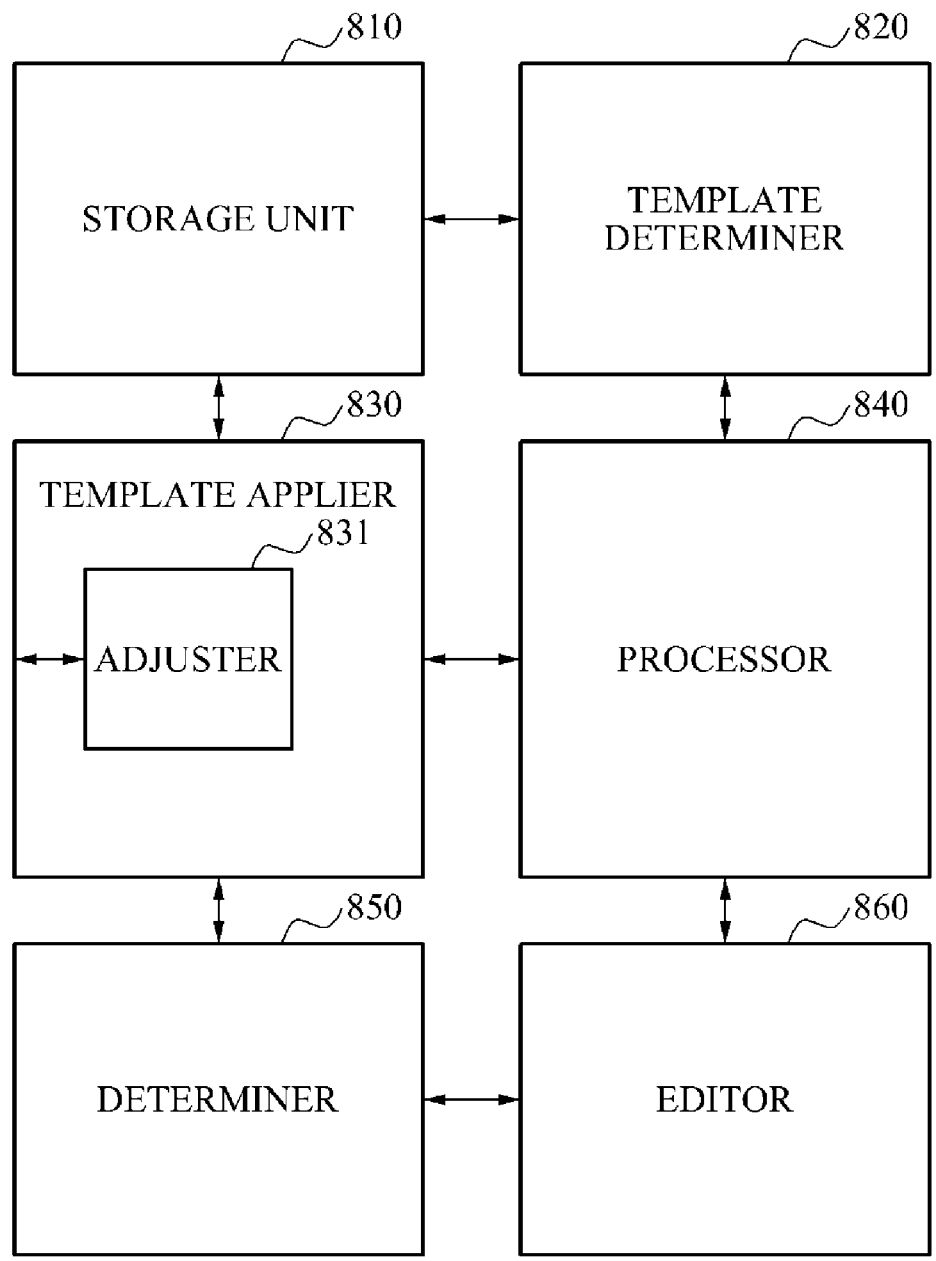
FIG. 8 is a block diagram illustrating a system for providing a widget according to an exemplary embodiment of the present invention.

FIG. 8 is a block diagram illustrating a system for providing a widget according to an exemplary embodiment of the present invention.

Referring to FIG. 8, the system according to the present embodiment may include a storage unit 810, a template determiner 820, a template applier 830, a processor 840, a determiner 850, and an editor 860.

The storage unit 810 may store a plurality of widgets.

In addition, the storage unit 810 may store a plurality of predetermined templates.

The template determiner 820 may determine a template having at least one attribute.

In addition, the template determiner 820 may determine a template including at least two areas having different attributes. For example, the template determiner 820 may determine a template to include a first area and a second area having different attributes.

The template applier 830 may apply the determined template to a widget selected from the plurality of widgets.

In addition, the template applier 830 may include an adjuster 831 to adjust at least the size and/or position of the selected widget to be included within the determined template.

In this instance, the adjuster 831 may adjust a position of the determined template to include the selected widget while the selected widget is fixed.

The processor 840 may process areas of the selected widget corresponding to the determined template, in response to the application of the determined template to the selected widget.

In addition, the processor 840 may display an area of the selected widget corresponding to the first area and an area of the selected widget corresponding to the second area, using different visual representations.

Further, the processor 840 may process the areas of the selected widget such that disposition of another widget, icon, and object distinct from the selected widget is allowed in the area of the selected widget corresponding to the first area, and prohibited in the area of the selected widget corresponding to the second area.

The determiner 850 may determine cells set by a first attribute in a grid of the template to be the first area, and determine cells set by a second attribute in the grid of the template to be the second area. In this example, an attribute of the second area may be distinct from an attribute of the first area.

The editor 860 may activate a function to edit the template.

In addition, the editor 860 may edit the first area and the second area included in the template, based on attributes set for the cells included in the grid of the template.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any non-transient type of machine, component, physical or virtual equipment, computer storage medium or device capable of providing instructions or data to or being interpreted by the processing device. The software also may be distributed over a network coupled computer systems so that the software is stored and executed in a distributed fashion. In particular, the software and data may be stored by one or more non-transient computer readable recording mediums.

The methods according to the above-described exemplary embodiments may be recorded in non-transient computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transient computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to exemplary embodiments of the present invention, a method, apparatus, and system for providing a widget having various shapes may be provided.

According to exemplary embodiments of the present invention, a method, apparatus, and system using a template including a first area and a second area provided in a non-square and/or non-rectangular form and having different attributes, in a process of processing a widget, may be provided.

According to exemplary embodiments of the present invention, a method, apparatus, and system for processing an area of a widget corresponding to a first area and an area of a widget corresponding to a second area, separately, in a process of processing a widget, may be provided.

According to exemplary embodiments of the present invention, a method, apparatus, and system for supporting a function to edit a template may be provided.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A apparatus to provide a widget, the apparatus comprising:
   a storage unit to store widgets;
   a determiner to determine a template including a cell, the cell having an attribute;
   an applier to apply the determined template to a widget; and
   a display unit to display the widget corresponding to the attribute of the cell of the determined template.

2. The apparatus of claim 1, wherein the template has a first area comprising one or more cells with one or more attributes.

3. The apparatus of claim 2, wherein the first area has a display attribute allowing display of the widget in the first area.

4. The apparatus of claim 2, wherein the first area has a disposition attribute prohibiting disposition of another object distinct from the widget in the first area.

5. The apparatus of claim 2, wherein the template has a second area distinct from the first area comprising one or more cells with one or more attributes.

6. The apparatus of claim 5, wherein the second area has a display attribute and disposition attribute different from the display attribute and the disposition attribute of the first area.

7. The apparatus of claim 1, wherein the applier applies the template to the widget by adjusting a size and position of the widget to correspond to an area of the cells of the template having attributes allowing display of the widget.

8. The apparatus of claim 1, wherein the applier comprises:
   an editor to edit the template by adding or deleting cells in different directions.

9. The apparatus of claim 8, wherein the editor edits the template into a non-rectangular shape.

10. A method of displaying widgets on a mobile device, the method comprising:
    storing widgets;
    determining a template with at least one cell, the at least one cell having an attribute;
    applying the template to a widget; and
    displaying the widget corresponding to the attribute of the determined template.

11. The method of claim 10, wherein the determining of the template comprises:
   determining a first area of the template with one or more cells.

12. The method of claim 11, wherein
   the widget is displayed in the first area if the first area has a display attribute allowing displaying the widget, and
   the widget is not displayed in the first area if the first area has a display attribute prohibiting displaying the widget.

13. The method of claim 11, wherein
   an object distinct from the widget is disposed in the first area if the first area has a disposition attribute allowing disposition of the object, and
   the object is not disposed in the first area if the first area has a disposition attribute prohibiting disposition of the object.

14. The method of claim 11, wherein the determining of templates comprises:
   determining a second area of the template, the second area having attributes distinct from attributes of the first area.

15. The method of claim 14, wherein another object distinct from the widget is disposed and displayed in the second area.

16. The method of claim 10, wherein the applying of the template to the widget comprises:
   adjusting a size and a position of the widget to accommodate the widget in the an area of the template.

17. The method of claim 10, wherein the applying of the template to the widget comprises:
   adjusting a position of the template to include the widget in an area of the template while the widget remains fixed.

18. The method of claim 10, wherein determining of the template comprises editing the template by adding or deleting cells in different directions, the edited cells of the template having the same attributes as the non-edited cells of the template.

* * * * *